Oct. 30, 1923.
R. A. FESSENDEN ET AL
1,472,558
DIRECTIONAL RECEIVING OF SUBMARINE SIGNALS
Filed July 18, 1918     3 Sheets-Sheet 2
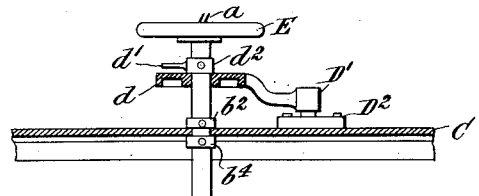
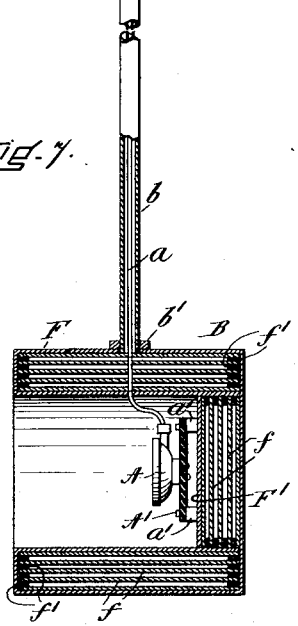
Fig. 7.
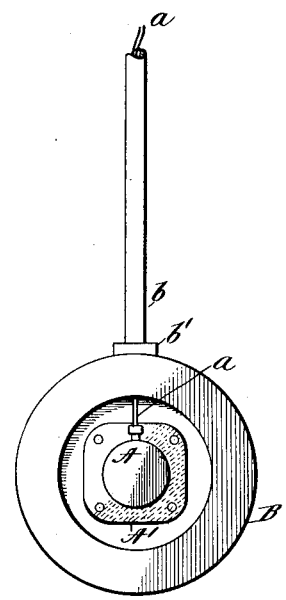
Fig. 8.
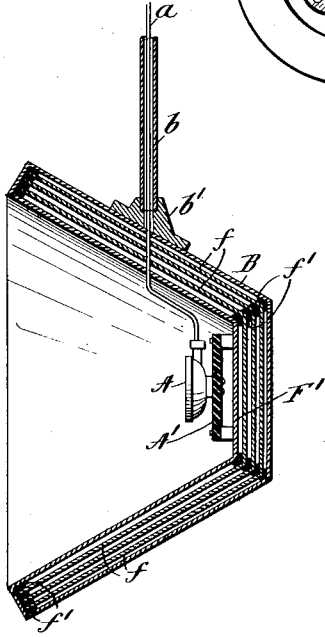
Fig. 9.
INVENTORS
Reginald A. Fessenden
Robert L. Williams
Edward L. Wood
By
ATTORNEYS

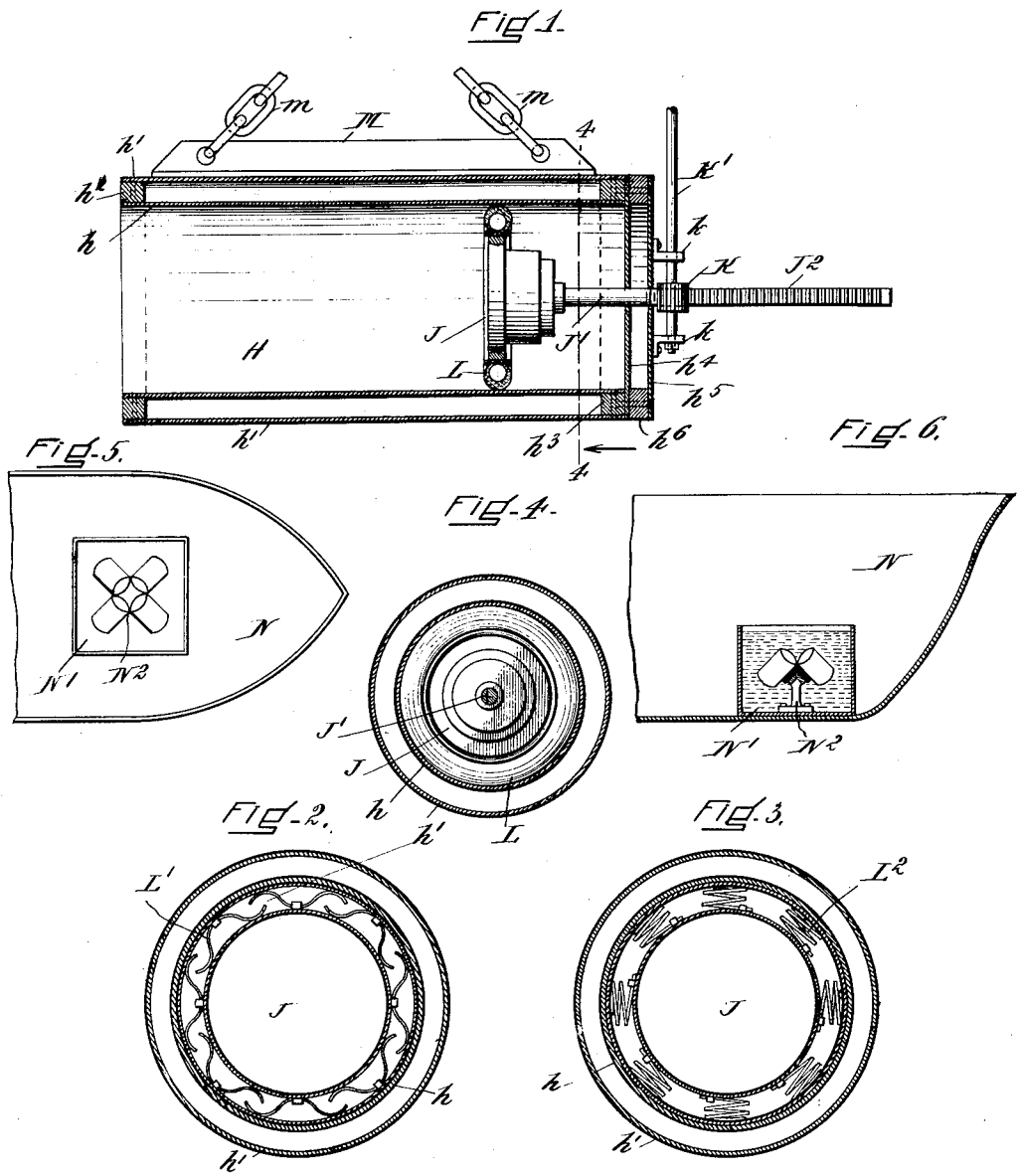

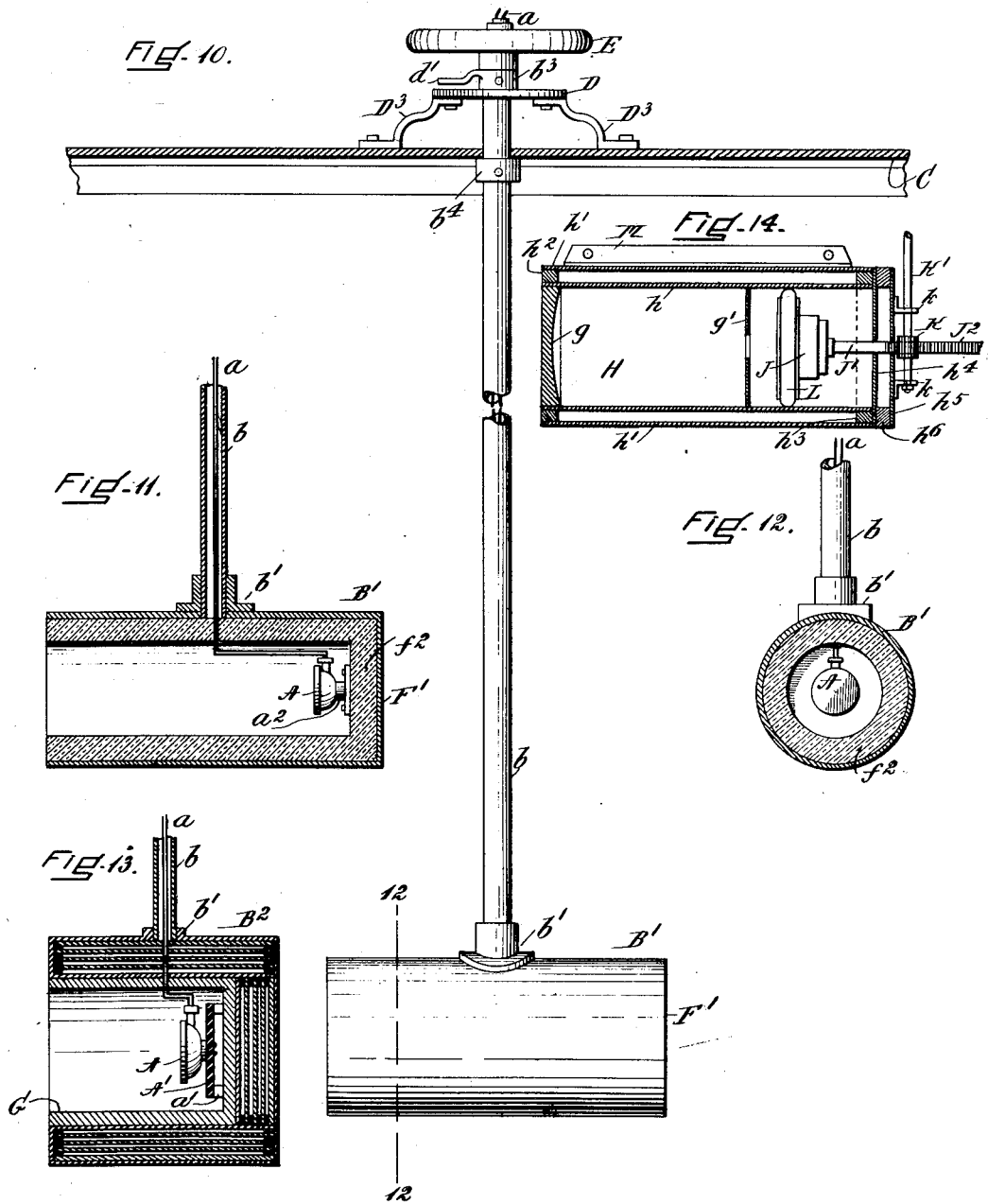

Patented Oct. 30, 1923.

1,472,558

UNITED STATES PATENT OFFICE.

REGINALD A. FESSENDEN, OF BROOKLINE, ROBERT L. WILLIAMS, OF NEWTON, AND EDWARD C. WOOD, OF SOMERVILLE, MASSACHUSETTS, ASSIGNORS TO SUBMARINE SIGNAL COMPANY, OF PORTLAND, MAINE, A CORPORATION OF MAINE.

DIRECTIONAL RECEIVING OF SUBMARINE SIGNALS.

Application filed July 18, 1918. Serial No. 245,547.

*To all whom it may concern:*

Be it known that we, REGINALD A. FESSENDEN, of Brookline, in the county of Norfolk and State of Massachusetts, ROBERT L. WILLIAMS, of Newton, in the county of Middlesex, in said State, and EDWARD C. WOOD, of Somerville, in the county of Middlesex, in said State, all citizens of the United States, have invented a new and useful Improvement in Directional Receiving of Submarine Signals, of which the following is a specification.

In receiving submarine signals foreign water noises, that is, noises due to the splashing of the water against the side of the receiving ship, etc., and noises on the receiving ship itself, interfere seriously with the weaker sounds of the ship under observation. Thus in listening for a submarine or other sound producer, the listening or receiving apparatus may in itself be sufficiently sensitive to detect the expected under-water sound waves, but the extraneous noises referred to may drown out the expected noises and the receiving apparatus may thus be ineffective for the purpose desired.

When a receiving instrument is used, for example, in submarine detection or indetermining the direction from which a sound is proceeding, it should be mounted so as to be protected from the receipt of lateral vibrations and, if used overboard, should be capable of rotation on a vertical axis so that its face may be made normal to sounds coming through open water from substantially any direction. At the same time sound waves coming to it at any moment from a lateral direction, i. e., a direction not normal to its face—should not be allowed to reach it.

To secure such results is the purpose of our invention, and it consists in mounting a listening apparatus near the closed end of a tube which may be rotatable about a vertical axis and constructed to be impenetrable to a considerable degree to any sound waves which may strike it so that substantially the only sound waves which will strike the listening instrument will be those approaching from a direction normal to its face.

Our invention will be understood by reference to the drawings, in which—

Figure 1 shows in longitudinal section a mounting for an oscillator of the type described in United States Letters Patent No. 1,167,366, dated January 4, 1916, the oscillator being shown in elevation.

Figs. 2 and 3 show other forms of mounting the oscillator.

Fig. 4 is a section on line 4—4 of Fig. 1.

Fig. 5 is a plan, and

Fig. 6 a vertical section showing a means of permanently mounting four receivers on shipboard to compare sounds coming from four different directions.

Fig. 7 shows in vertical section a microphone support embodying our invention;

Fig. 8 being a front elevation of the microphone and its mounting.

Fig. 9 shows a similar mounting in vertical section.

Fig. 10 is an elevation of another embodiment of our invention;

Fig. 11 being a longitudinal section of the microphone mounting, and

Fig. 12 a section on line 12—12 of Fig. 10.

Fig. 13 shows in section an additional form of microphone mounting.

Fig. 14 is a longitudinal section of a modification of the device shown in Fig. 1.

In Figs. 1 to 4, inclusive, there is shown means for mounting the oscillator above referred to, which means comprises a cylindrical sound screen supported from above. The sound screen itself forming the enclosure for the oscillator is lettered H, the oscillator being lettered J. The cylinder H is composed of two cylinders $h$ and $h^1$ made preferably of sheet or thin metal, these cylinders being of different diameters and arranged concentrically, being separated from each other by rings $h^2$, $h^3$ to which rings they are bolted to form an airtight chamber. The rear end of this device as shown in Fig. 1 is provided with a plate or disk $h^4$ separated from a similar disk $h^5$, a ring $h^6$ being located between $h^4$ and $h^5$ to separate them, and being screwed or otherwise attached to the ring $h^3$.

The oscillator J has projecting from its rear end a tube $J^1$ the rear portion of which is formed with rack teeth $J^2$ or has a rack attached thereto in mesh with a pinion K. This pinion K is mounted on a shaft $K^1$ and is suitably supported by brackets $k$ attached to the plate $h^5$. Through the tube $J^1$ may be carried a cable comprising the leads from the oscillator. The oscillator is surrounded by a hollow tube L of resilient material, such for example as the ordinary automobile tire, whereby the oscillator will be yieldingly centered and added protection from lateral vibration given it.

It will be seen that by turning the rod or shaft $K^1$ the oscillator may be moved toward and from the mouth of its casing H and thus may at any time be set at what may be found to be its most advantageous position.

The casing H is mounted in a cradle M, the upper part of which only is shown, to which are attached chains $m$ by which the apparatus is supported in the water from a suitable crane or otherwise located on board ship, or in any other desired position.

In practice the sound screen will act to prevent noises which approach the casing from the sides or the rear from influencing the oscillator, so that the oscillator would get substantially the full benefit of all compressional waves entering the casing in lines substantially parallel with its axis.

In Figs. 2 and 3 we have shown vertical sections of a construction operative like that shown in Fig. 1, there being substituted for the tube L in Fig. 2 a series of leaf springs $L^1$, and in Fig. 3 a series of spiral springs $L^2$, these springs being attached to bear upon the inner cylinder $h$ and also upon the rim of the oscillator, so that the oscillator will be held out of contact with the cylinder $h$.

In Figs. 5 and 6 we have shown a desirable means of mounting these casings containing the receiving instrument on board ship. N is a portion of the bow of the ship containing the tank $N^1$ filled with water or other liquid. On the bottom of this tank is mounted a pedestal $N^2$ adapted to support four of these casings preferably pointed downward as shown in Fig. 6 and preferably arranged as in Fig. 5 so as to point in four different directions at an angle to say 45 degrees to what we will term the longitudinal axis of the ship, thus being able to receive sounds from both the bow, the stern and the beam of the ship.

In Figs. 7 to 13 a similar mounting is shown in which a microphone A is used as the receiving instrument, the casing being in this case supported preferably from the deck of the ship.

B, $B^1$, $B^2$ are forms of casing within which the microphone is mounted. These casings are in each case supported from the deck C of the ship in substantially the same manner. Each casing has a tube $b$ connected to one side thereof by a collar or casting $b^1$, which surrounds an opening in the casing, and leads $a$ from the microphone pass out through the opening and up through the tube $b$ to the receiving instrument (not shown).

The tube is attached to the deck C in some convenient way so that the apparatus may be rotated to turn the casing in any given direction. As shown, this is accomplished by two collars attached to the tube $b$, one a supporting collar $b^2$ resting on the deck as in Fig. 7, or, as in Fig. 10, the collar $b^3$ resting on the part D above the deck as below described. The other collars $b^4$ are located below the deck and limit the vertical movement of the device.

It is preferable to supply the device with a pointer $d^1$, which is attached to the tube $b$ parallel with the casing B, $B^1$ so as to indicate the direction in which the open end of the casing is facing.

In Fig. 7 $D^1$ is an arm supported from a plate $D^2$ attached to the deck. This arm carries a dial $d$ which may be graduated in any desired way. The pointer $d^1$ is carried by a collar $d^2$ attached to the tube $b$ to turn with it. The tube $b$ is turned by a hand-wheel E mounted on its top, and carries the pointer $d^1$ with it.

Substantially the same structure is shown in Fig. 10 where the dial D is supported on two arms $D^3$ and the pointer $d^1$ is attached to the collar $b^3$, which is attached to the tube $b$.

In the construction of Figs. 7 and 9 the microphone A is mounted on a plate $A^1$ which is attached by legs $a^1$ or otherwise to the rear wall $F^1$ of the chamber in the casing B, $B^1$. The plate $A^1$ is of sound-insulating or absorbing material. In Fig. 11 this is not necessary because the entire casing is lined with sound-absorbing material, the microphone being mounted on a standard $a^2$ attached to the rear wall $F^1$ of the chamber in the casing.

In these forms of our device the outer wall F of the casing may be of metal or other material, preferably such as will not oxidize or otherwise deteriorate when submerged in water, to protect the sound-absorbing material from damage by extraneous contact. In the form of our invention shown in Figs. 7 and 10 this outer wall is cylindrical. In Fig. 9 it is shaped like a truncated cone.

As shown in Fig. 7 the means for protecting the microphone from the extraneous noises comprises a sound screen composed of a series of concentric cylinders $f$ or the like, preferably of wood or other like material and separated from each other by spacers $f^1$ made preferably of vibration-absorbing material such as soft rubber, the whole forming a series of cells so that sound waves striking the exterior of the device must pass through media of different densities before reaching the microphone and are thus absorbed. By this means such sound waves are materially deadened and become ineffective. The closed end of the casing is similarly constructed.

The device of Fig. 9 is identical except for its shape, being made of concentric conical sections instead of concentric cylinders.

In the device of Figs. 11 and 12 the outer wall $B^1$ of the casing is lined as at $f^2$ with a sound-absorbing material such as soft india rubber,—a lining such that the sound waves entering the chamber in the casing and coming into contact with it will not be reflected so as to set the microphone into appreciable vibration. Other materials will answer the purpose, as will be clear to those skilled in the art.

If it be desired not only to protect the microphone from foreign water noises, but also to ensure its effectiveness as regards those sounds which originate at a source located in a general direction opposite its open mouth, we may line the sound-absorbing casing with a heavy lining G of iron or the like (see Fig. 13), mounting the microphone on this lining in some convenient manner such as is described above in connection with Fig. 10. In this case the microphone will be energized by all the sounds which enter this casing and are reflected upon it from the lining and at the same time will be acoustically insulated from this lining. Thus the sound waves which strike the casing on it exterior are absorbed by the screen or absorbing construction and those sounds which enter the chamber in the casing not exactly normal to the microphone will be reflected by the lining toward the microphone, thus preventing the absorption of sound in the chamber near the microphone and allowing all the sound waves which enter the open end of the chamber to energize the microphone.

The length and diameter of the receiver chamber, surrounded by what we will term the protector or sound insulator, may be determined according to circumstances, though it will be evident that the better protection given to the microphone and within certain limits the greater the distance of the microphone from the open end of the casing, the better the directional results. The adjustment of the microphone in or out may be effected as in the case of the oscillator by attaching its mounting $A^1$ to a rack and pinion mechanism. About three-quarters of the extraneous noises should be cut out, leaving only those the waves of which come from the same direction as the waves it is desired to receive.

In practice the casing will be rotated slowly with its open mouth in the general direction from which the sound may be proceeding. Thus oscillating the casing slowly, when that point is found from which the results are the strongest, the casing is pointing in the general direction from which the sound waves are coming, and when a pointer is used as above described the pointer will indicate that direction.

In Fig. 14 is shown a still further development of this invention where the apparatus as shown in Fig. 1 is fitted with a lens $g$, for concentrating or focusing the sound on the receiver, and also with a perforated diaphragm $q^1$. This arrangement may be used with other receivers. The lens $g$ is shaped as shown and preferably formed of wood or aluminum. If formed of wood the fibres are preferably arranged so as to run in the direction of the axis of the cylinder. The lens is made plano-concave as shown, because this shape focuses the sound on account of the velocity of sound in wood or aluminum being greater than that in water.

Behind the lens and slightly in front of the sound receiver is placed a sound-insulating or sound-absorbing diaphragm $q^1$, having a hole at its centre to allow the sounds focused by the lens $g$ to impinge on the receiver while reflecting or absorbing unfocused sounds.

While this construction is shown and is preferably used with the oscillator, any other suitable form of receiver, such for example as a microphone, may be substituted therefor.

In using the term "closed end" in describing the casing we means that part which is opposite the open mouth. It is evident that the shape is immaterial.

Other embodiments of our invention will occur to those skilled in the art.

If the vibrations received at the microphone are not sufficiently loud they may be amplified in any one of the well known ways.

Four microphones may be mounted on board ship in the receiver shown in Figs. 4 and 5 with good results, or in other ways, for our invention relates primarily in the mounting of a receiving instrument within a protecting screen.

What we claim as our invention is:—

1. The device above described comprising a sound receiver and a mounting therefor, said mounting comprising a tubular sound screen one end of which is provided with a sound-insulating closure, said sound receiver being located within said tubular sound screen and near the closed end thereof with its receiving face pointing to the other end thereof, in combination with means for adjusting the position of said receiver longitudinally of said casing.

2. The device above described comprising a sound receiver and a mounting therefor, said mounting comprising a tubular sound screen one end of which is provided with a sound-insulating closure, said sound receiver being located within said tubular sound screen and near the closed end thereof with its receiving face pointing to the other end thereof, in combination with means for supporting the receiver from the closed end of said casing and for centering the receiver with relation to the side walls of the casing.

3. The device above described comprising a sound receiver and a mounting therefor, said mounting comprising a tubular sound screen one end of which is provided with a sound-insulating closure and the other end having a sound-focusing means, said sound receiver being located within said tubular sound screen and near the closed end thereof with its receiving face pointing to the other end thereof.

4. The device above described comprising a sound receiver and a mounting therefor, said mounting comprising a tubular sound screen one end of which is provided with a sound-insulating closure, the other end being closed with a sound-focusing means, said sound receiver being located within said sound screen near said sound-insulating end, in combination with a perforated sound-insulating diaphragm located within said sound screen and between said sound-focusing means and said receiver.

5. A sound-receiving apparatus comprising a tubular casing closed at one end and comprising a plurality of concentric cylinders having air between them, and a receiver located within and near the closed end of said casing and having its receiving face directed toward its open end, and a mounting for said receiver and means for adjusting the position of said mounting longitudinally with relation to said casing whereby the position of said receiver may be adjusted.

6. The sound receiver mounting above described which consists of a tubular sound screen closed at one end and having a sound receiver mounted therein with its face opposite the open mouth thereof, the walls and end of said sound screen comprising a rigid sound-reflecting material, and a yielding support to centre said receiver in said casing.

REGINALD A. FESSENDEN.
ROBERT L. WILLIAMS.
EDWARD C. WOOD.